United States Patent
Szajewski et al.

[11] Patent Number: 5,870,643
[45] Date of Patent: Feb. 9, 1999

[54] SINGLE-USE FLASH CAMERAS WITH REFLECTOR OR SIREN

[75] Inventors: Richard Peter Szajewski; Allan Francis Sowinski, both of Rochester, N.Y.

[73] Assignee: Eastman Kodak Company, Rochester, N.Y.

[21] Appl. No.: 579,681

[22] Filed: Dec. 28, 1995

[51] Int. Cl.⁶ .......................... G03B 29/00; G03B 15/03; G03B 17/02
[52] U.S. Cl. .......................... 396/429; 396/177; 396/535
[58] Field of Search .................. 354/413, 415, 354/145.1, 149.1, 149.11, 126, 132, 75, 76, 81, 354, 289.1, 289.12, 288; 315/151; 396/164, 173, 177, 198, 283, 535, 540, 541, 429, 433

[56] References Cited

U.S. PATENT DOCUMENTS

| | | | |
|---|---|---|---|
| 2,600,363 | 6/1952 | Morris | 396/429 |
| 4,055,759 | 10/1977 | Bouchard et al. | 354/142 |
| 4,060,372 | 11/1977 | Buck et al. | 431/93 |
| 4,204,269 | 5/1980 | Plummer | 362/17 |
| 4,247,600 | 1/1981 | Adachi | 428/607 |
| 4,275,335 | 6/1981 | Ishida | 315/151 |
| 4,456,336 | 6/1984 | Chung et al. | 350/338 |
| 4,522,146 | 6/1985 | Carlson . | |
| 4,525,046 | 6/1985 | Takaoka et al. | 354/149.11 |
| 4,538,894 | 9/1985 | Shirane . | |
| 4,591,762 | 5/1986 | Nakamura | 315/207 |
| 4,595,258 | 6/1986 | LeCompte | 354/245 |
| 4,629,667 | 12/1986 | Kistner et al. | 430/11 |
| 4,641,937 | 2/1987 | Suzuki | 354/289.1 |
| 4,651,144 | 3/1987 | Pagano . | |
| 4,667,188 | 5/1987 | Schwartz | 340/689 |
| 4,682,852 | 7/1987 | Weber | 350/105 |
| 4,717,861 | 1/1988 | Yuasa et al. | 354/145.1 |
| 4,719,454 | 1/1988 | Hopkins et al. | 340/574 |
| 4,748,382 | 5/1988 | Walker | 354/418 |
| 4,775,219 | 10/1988 | Appeldorn et al. | 350/103 |
| 4,797,697 | 1/1989 | Heuer et al. | 354/75 |
| 4,806,911 | 2/1989 | Petri | 340/574 |
| 4,810,540 | 3/1989 | Ellison et al. | 428/31 |
| 4,896,178 | 1/1990 | Ohmura et al. | 354/145.1 |
| 4,931,324 | 6/1990 | Ellison et al. | 428/31 |
| 4,938,563 | 7/1990 | Nelson et al. | 354/145.1 |
| 5,006,832 | 4/1991 | Beaudry | 340/574 |
| 5,032,824 | 7/1991 | Corbin | 340/574 |
| 5,045,871 | 9/1991 | Reinholdsox | 354/76 |
| 5,075,671 | 12/1991 | Livingston | 340/574 |
| 5,086,311 | 2/1992 | Naka et al. | 354/195.1 |
| 5,089,914 | 2/1992 | Prescott | 359/815 |
| 5,107,287 | 4/1992 | Swayze | 354/149.11 |
| 5,146,250 | 9/1992 | Sakamoto | 354/145.1 |
| 5,155,474 | 10/1992 | Park et al. | 354/76 |
| 5,170,199 | 12/1992 | Nakai et al. | 354/126 |
| 5,213,404 | 5/1993 | Chen . | |
| 5,229,882 | 7/1993 | Rowland | 359/530 |
| 5,235,364 | 8/1993 | Ohmura et al. | 354/149.11 |
| 5,237,449 | 8/1993 | Nelson et al. | 359/532 |
| 5,258,746 | 11/1993 | Leitten et al. | 340/574 |
| 5,262,809 | 11/1993 | Nishimura et al. | 354/75 |
| 5,264,063 | 11/1993 | Martin | 156/247 |
| 5,305,033 | 4/1994 | Takahashi et al. . | |
| 5,305,083 | 4/1994 | Takashi et al. | 396/429 |
| 5,315,332 | 5/1994 | Hirasaki et al. | 354/149.11 |
| 5,337,099 | 8/1994 | Tasaka et al. | 354/76 |

(List continued on next page.)

FOREIGN PATENT DOCUMENTS

| | | |
|---|---|---|
| 1076398 | 7/1967 | United Kingdom . |
| 2127164 | 4/1984 | United Kingdom . |
| 2128762 | 5/1984 | United Kingdom . |
| 2201801 | 9/1988 | United Kingdom . |
| 2208557 | 4/1989 | United Kingdom . |
| 2238881 | 6/1991 | United Kingdom . |
| 2242497 | 10/1991 | United Kingdom . |
| 2252836 | 8/1992 | United Kingdom . |
| 2258321 | 2/1993 | United Kingdom . |

*Primary Examiner*—Eddie C. Lee
*Assistant Examiner*—Nicholas J. Tuccillo
*Attorney, Agent, or Firm*—Paul A. Leipold

[57] ABSTRACT

The invention relates to a single-use camera comprising an apparatus for reflecting light and/or a siren.

21 Claims, 9 Drawing Sheets

U.S. PATENT DOCUMENTS

| | | | |
|---|---|---|---|
| 5,342,666 | 8/1994 | Ellison et al. | 428/46 |
| 5,349,920 | 9/1994 | Koizumi | 116/30 |
| 5,353,076 | 10/1994 | Goddard | 354/94 |
| 5,361,111 | 11/1994 | Yamashina et al. | 354/266 |
| 5,376,431 | 12/1994 | Rowland | 428/164 |
| 5,420,570 | 5/1995 | Leitten et al. | 340/574 |
| 5,463,439 | 10/1995 | Zander | 354/75 |
| 5,534,962 | 7/1996 | Zahdor | 354/289.12 |
| 5,644,296 | 7/1997 | Miller | 396/429 |

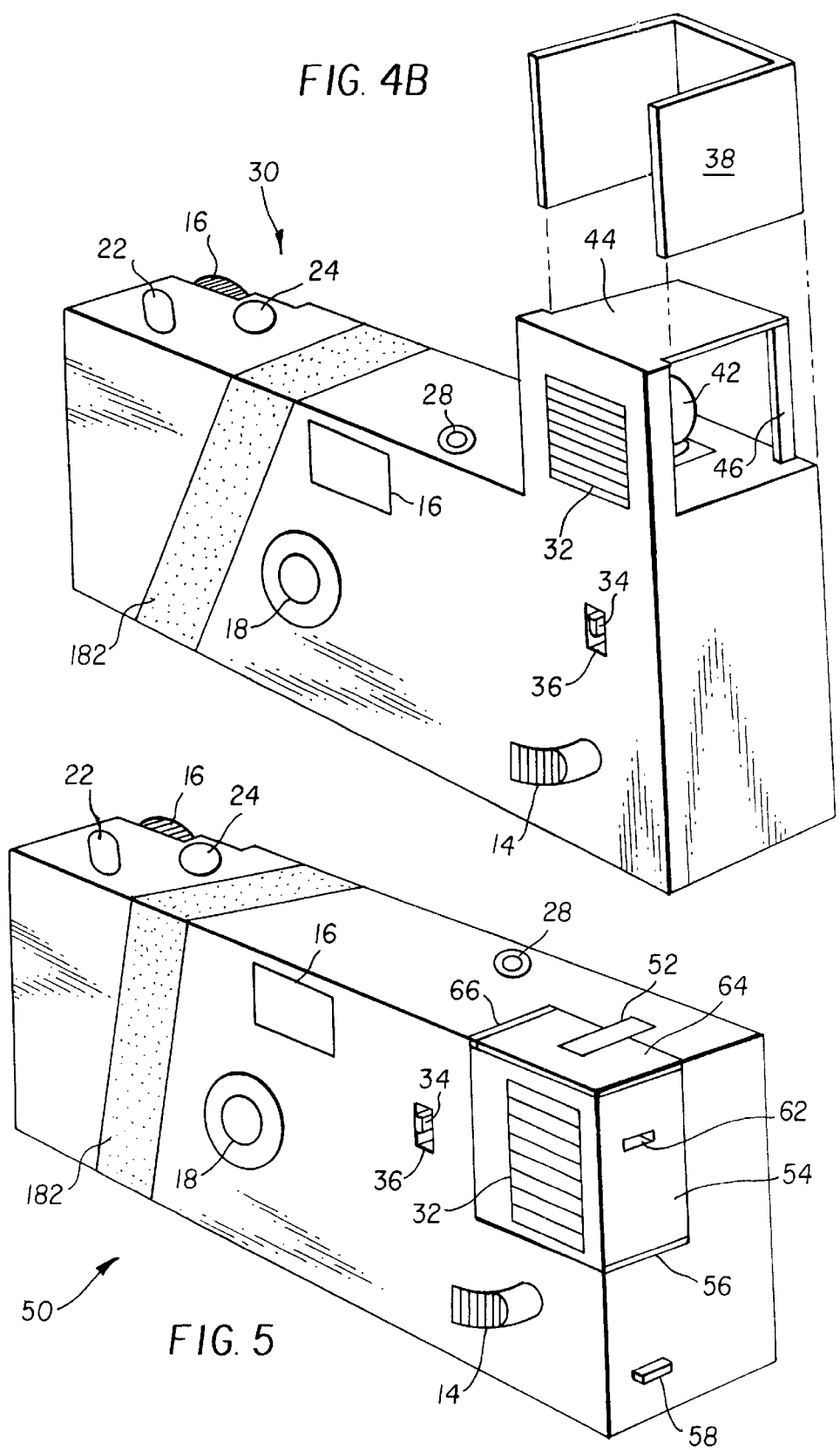

5,870,643

SINGLE-USE FLASH CAMERAS WITH REFLECTOR OR SIREN

FIELD OF THE INVENTION

This invention relates to single-use cameras. It particularly relates to a flash camera that also incorporates a siren and reflection means.

BACKGROUND OF THE INVENTION

Single-Use Cameras, also known as Film with Lens Units One-Time-Use Cameras or Recyclable Cameras, have provided the camera user with a miniaturized, inexpensive, rugged and easy to operate alternative to traditional camera designs. As a result, these Single-Use Cameras are often carried by their owners on a regular basis and employed under conditions where owners would not normally take expensive cameras. These modern Single-Use Cameras are now available with many amenities designed to make picture taking more enjoyable and easier under a variety of environmental or lighting conditions. For example, these cameras are now available with flash units designed to widen the range of suitable lighting conditions. Other units are available in water resistant housings, or in submersible housings for underwater photography, and with modified film formats, for example, panoramic formats, all designed to encourage carrying the camera around in daily activities, or in travel, or in adventurous vacation settings that may subject both the camera and user to risks of weather, accessibility, or even danger. Manufacturers have even encouraged the storage of such cameras in auto glove compartments so that they can be available to record damage from auto accidents. Representative examples of Single-Use Cameras are described in U.S. Pat. Nos. 4,896,178; 4,954,858; 5,086,311; 5,170,199; 5,235,364; 5,315,332; 5,337,099; 5,353,076 and 5,361,111.

PROBLEM TO BE SOLVED BY THE INVENTION

While these cameras are certainly excellent for their intended use, i.e recording scenes, the additional features, such as the incorporated power sources and circuitry associated with the incorporated flash units, represent an as yet untapped opportunity to provide the consumer with additional values. Their convenience for travel and storage in vehicles also provides opportunity to increase value.

SUMMARY OF THE INVENTION

It is an object of the invention to provide additional features in a single-use camera.

It is another object of the invention to provide a device that is both a signaling device and a camera.

It is a further object of the invention to provide a warning device that is a camera.

These and other objects of the invention generally are accomplished by providing a camera comprising a means for reflecting light.

In another preferred form the invention provides a single-use camera comprising a siren.

ADVANTAGEOUS EFFECT OF THE INVENTION

This invention provides the advantage that the power source and flash unit of a camera are utilized for multiple purposes. The batteries are utilized to power a siren. The flash unit is utilized both as a flash unit and as a continuous strobe unit. The wrapping of the camera provides a reflective warning and signaling device.

BRIEF DESCRIPTION OF THE DRAWINGS

FIG. 4 is a perspective view of a camera of the invention providing both continuous intermittent flashing and flash exposure for photography.

FIG. 5 is a perspective view of a camera of conventional rectangular profile that may be converted to continuous intermittent flashing.

DETAILED DESCRIPTION OF THE INVENTION

The invention has numerous advantages over the prior products for providing emergency warning by light, sound, or reflection, taking pictures, and providing continuous temporary illumination. Only one item needs to be carried rather than three. Further, that item is low in cost and may be renewed when the pictures have been taken and the camera is taken in for development. The addition of a continuous light source and circuitry for continuous flashing of the picture taking strobe and sounding a siren add relatively little to the cost of the camera while greatly improving its functionality. Further, it replaces three separate devices. Strobes, sirens, and flashlights are stored for emergency situations. Often the batteries of the strobe and the flashlight are expired prior to their use unless they were conscientiously replaced. In contrast, when these devices are added to a camera, the camera may be used to take flash pictures in the ordinary manner, and then another camera purchased to be available for emergency use. The invention also provides a camera that has the additional advantage that the subject matter of flash pictures in the dark may be illuminated with the flashlight so that the camera can be properly pointed toward the subject to be taken by flash photography and the picture be properly composed.

It is the intent of this invention to provide added benefit to the consumer by providing a single-use camera unit with integral flash that also provides a repetitive flashing function or a continuous illumination function especially valuable for those unforeseen circumstances that occasionally occur even during seemingly normal life. The single-burst or repetitive siren, continuous on siren, reflection means, emergency flashing function, or continuous lighting function is especially valuable during automobile boating or camping trips, or in the event of mishap, accident, emergency or natural disaster. These and other advantages will be apparent from the detailed description below.

Figure 1:
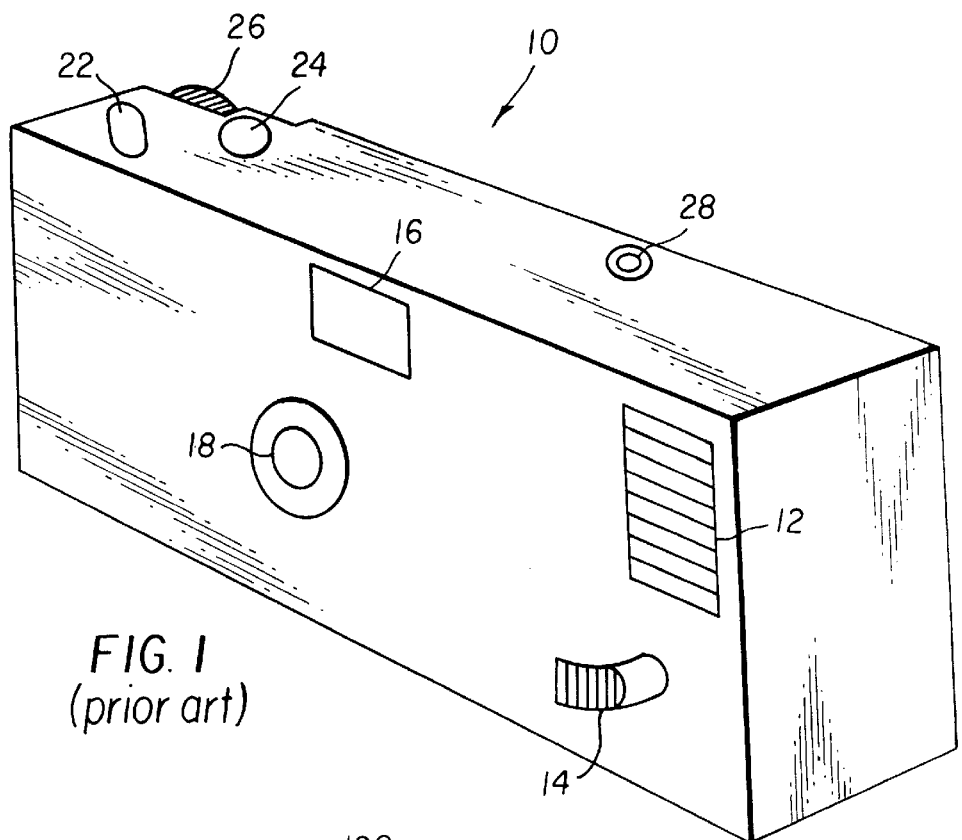
FIG. 1 is a perspective view of a single-use flash camera of the prior art.

Illustrated in FIG. 1 is a camera 10 representative of the prior art. The camera is a single-use camera that is provided with a flash 12. The flash 12 is activated by switch 14. The scene to be photographed is viewed through viewfinder 16 with photographs being taken through lens 18. The camera 10 is further provided with shutter release button 22 and film frame counter 24. The film is advanced between pictures by film advance wheel 26. 28 is the flash ready indicator light that lights when the flash is ready for picture taking. Cameras such as 10, while containing a flash device and batteries, do not provide means for providing a steady illumination such as a flashlight illumination or providing a continuing flashing to serve as a warning.

Figure 2:
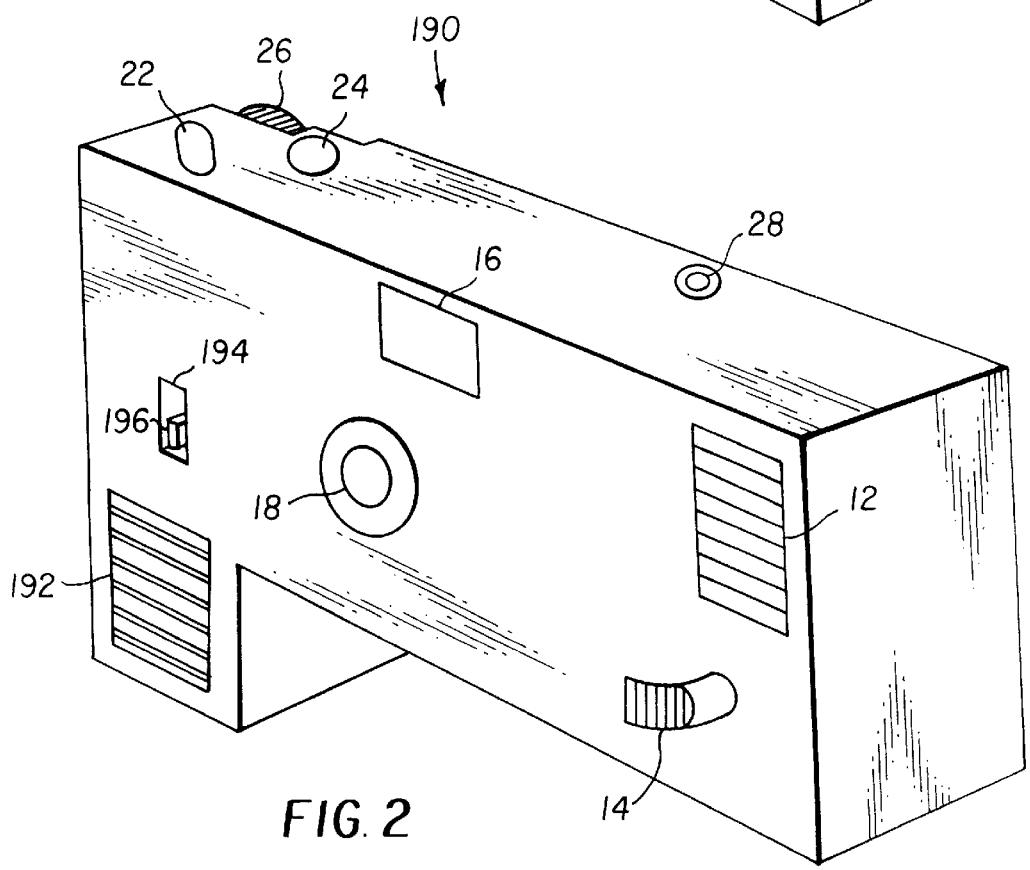
FIG. 2 is a perspective view of a camera of the invention providing a siren.

FIG. 2 illustrates camera 190 that is a single-use camera that is provided with a siren 192. Elements common to the prior art camera are indicated with the same numeral and are not repeated. The siren is activated by movement of switch 196 to the upper position in switch pad 194. While the term "siren 192" is utilized, the term "siren" is intended to include any loud noise-making device such as bells, whistles, horns, or the classic siren sound. Generally, whatever was cheapest and loudest would be utilized in the single-use camera. Specifically contemplated are siren or horn units employed in personal body alarms or safety alarms which emit loud piercing sound either intermittently via a squeeze switch or in continuous mode following removal of a pull cord pin. Such a pull cord pin makes the alarm difficult or impossible to turn off, so the alarm could not be silenced by an assailant. Such units are compact and readily fit within the palm of the hand, and serve as a deterrent to assault or to threatening animals, or serve to call for help in the case of an emergency or accident. It is preferred the siren emit a sound of at least 50 decibels, preferably 80 decibels, and most preferred in excess of 100 decibels. Typical sirens useful in the practice of this invention are described in Leitten et al U.S. Pat. Nos. 5,258,746 and 5,420;570; Livingstone U.S. Pat. No. 5,075,671; Corbin U.S. Pat. No. 5,032,824; Beaudry U.S. Pat. No. 5,006,832; Petri U.S. Pat. No. 4,806,911; Hopkins et al U.S. Pat. No. 4,719,454; and Schwartz U.S. Pat. No. 4,667,188. It is also possible that the siren switch would be formed such that the siren is not easily shut off or is impossible to turn off, as the siren then could not be silenced by an attacker.

Figure 3:
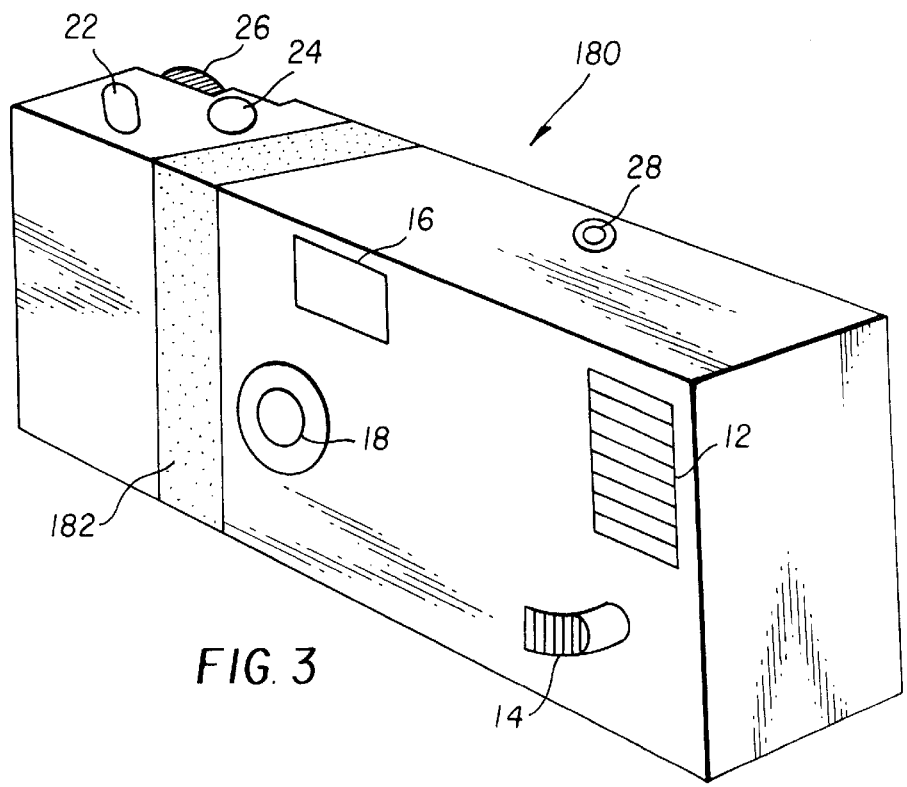
FIG. 3 illustrates in perspective a camera of the invention with a reflective area.

In FIG. 3 is illustrated an embodiment of the invention wherein the camera 180 is provided with a reflective stripe 182. A reflective stripe could be added as tape to the packaging or could be formed as an integral part of the wrapping of the camera. Such reflective materials are well known and are used to serve as warnings along highways. Further tapes are available for attachment to bicycles, vehicles, pedestrians, and life jackets to provide reflective capabilities and would be suitable for the camera of the invention. Specifically contemplated reflecting materials are adhesive-coated plastic films that comprise microscopic glass beads, or another brightness enhancing technique of plastic arrayed with microprisms, formed, for example, by microreplication techniques wherein a plastic surface is engraved by appropriate microscopic cutters. Such reflectors concentrate and direct the reflected light to boost its intensity and, therefore, increase visibility. It is preferred to apply the plastic reflecting material via an adhesive backing to the camera body. Alternately, reflective, fluorescing, or phosphorescing coatings or paints could be applied directly to the camera body, or the body itself may be formed directly from plastic having these properties.

The reflective materials useful in the practice of this invention can be any known in the art. The reflective materials can be applied in known ways, including but not limited to being applied as adhesive sheets, being applied as direct coatings, being incorporated into the camera body wrapping or being incorporated directly in the camera body during its formation. Particularly contemplated are reflective paints, dry paint films, fluorescent coatings, phosphorescent coatings, metalized coatings including aluminized mylar, reflective metallic films or metals including noble metals and gold leaf, reflective plastics, luminous coatings, reflective microspheres, retro-reflective surfaces, retro-reflective micro-prims, holographic metallized mirrors, and retro-reflective sheets. Of these, the retro-reflective and holographic materials are particularly preferred.

Technologies useful for achieving these ends are described in Chung et al U.S. Pat. No. 4,456,336; Appeldorn et al U.S. Pat. Nos. 4,775,219 and 4,938,563; Rowland U.S. Pat. Nos. 5,376,431 and 5,229,882; Martin U.S. Pat. No. 5,264,063; Koizumi U.S. Pat. No. 5,349,920; Weber U.S. Pat. No. 4,682,852; Hotchkiss et al U.S. Pat. No. 4,629,667; McCoy et al U.S. Pat. No. 5,237,449; and Ellison et al U.S. Pat. Nos. 4,810,540 and 4,931,324 and European Patent Application 0 266 107.

Figure 4A:
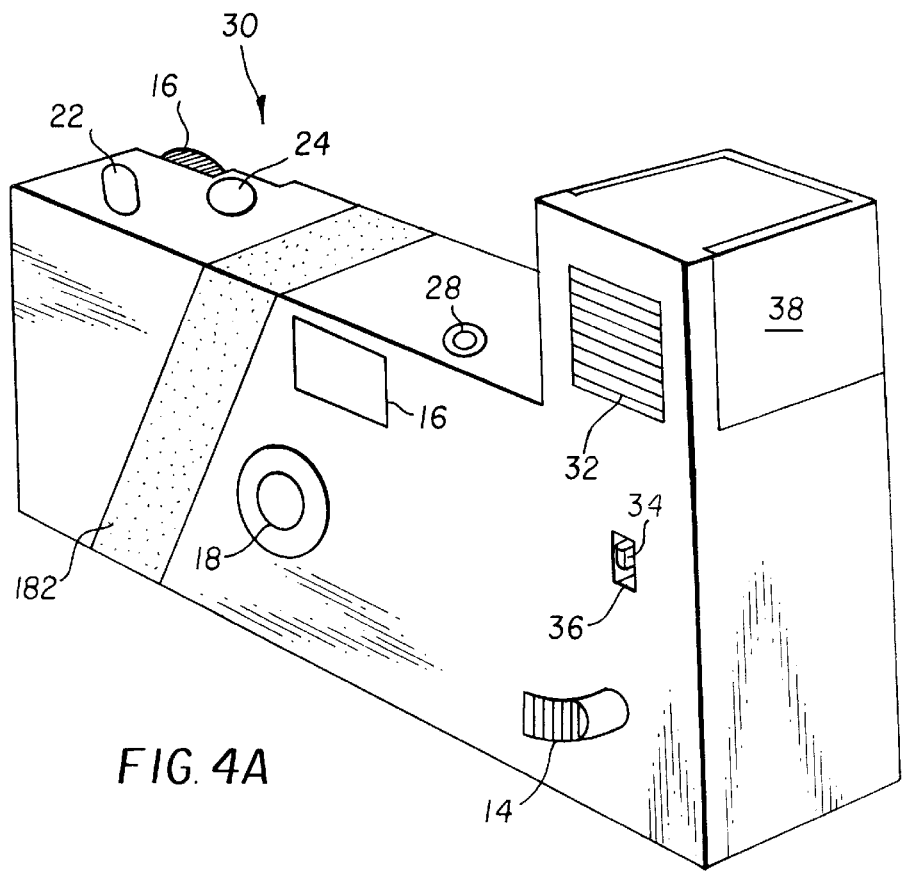
FIG. 4A illustrates in perspective the camera of FIG. 2 in mode for continuous intermittent flashing as a warning device.

Illustrated in FIGS. 4 and 4A is a single-use camera 30 with reflector 182 that provides the option of continuous flashing. Elements common to the prior art camera are indicated with the same numerals and will not be repeated. Camera 30 has a flash unit 32 that is utilized for flash pictures when activated by switch 14. In order to be utilized for continuous flashing, switch 34 is moved to a lower position 36. where circuitry, to be described later, allows the bulb to be intermittently flashed continuously until the switch is returned to the upper position.

When the camera 30 is to be utilized in the continuous flash mode as a warning light, the removable cover member 38 may be taken off as shown in FIG. 4A. This will allow the bulb 42 to be visible for substantially 360 degrees through the original flash opening 32, as well as on the back and sides of the camera 30. The bulb remains protected from the top by a permanently installed cover 44 which is supported by posts at the corners such as 46. It is also possible that the bulb 42 may be surrounded by transparent members at the back and sides that will be exposed by removable cover 38. Such protective members could incorporate lenses that would direct the light directly away from the camera such that it is better focused for warning at a greater distance, as well as protecting the bulb from abuse. However, as the camera probably would be only used in the emergency flashing mode once, such protection may not be necessary.

Figure 6A:
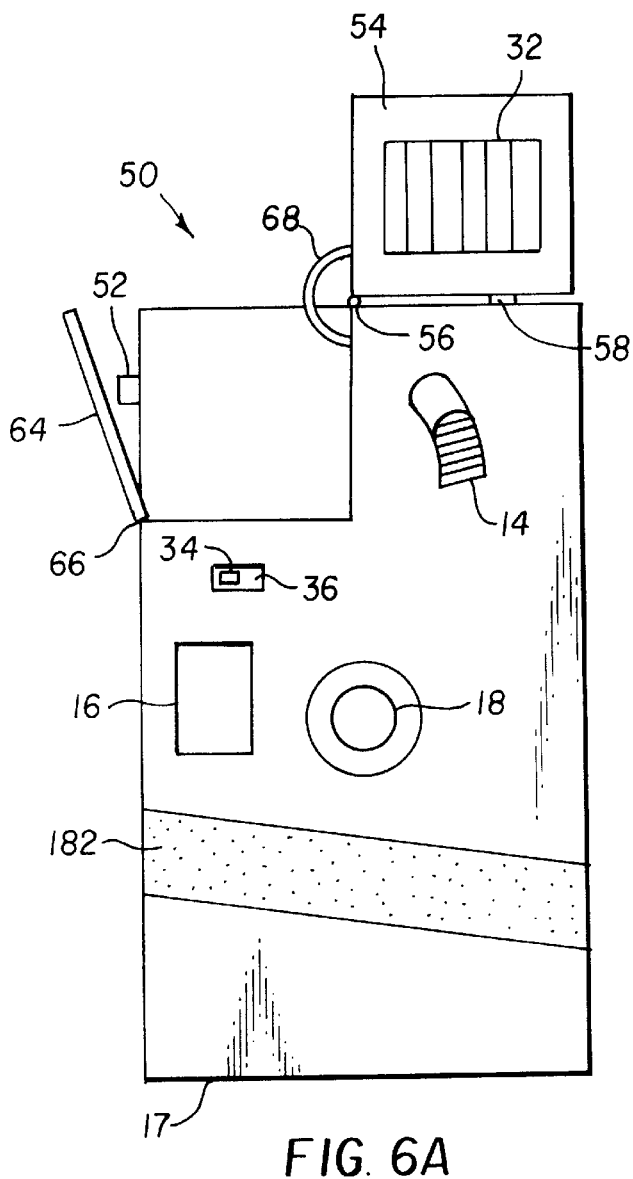
FIGS. 6, 6A, and 7 illustrate the camera of FIG. 4 in front, side, and top views when in position for continuous flashing with substantially 360-degree viewing.
Figure 6B:
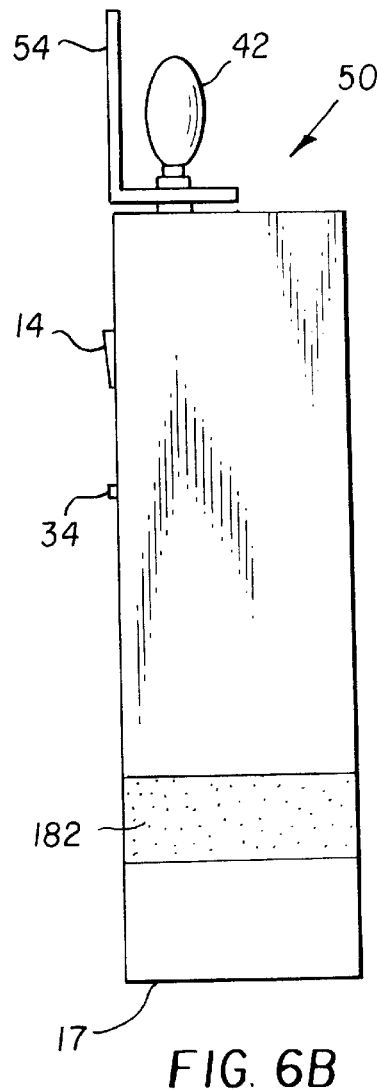
Figure 7:
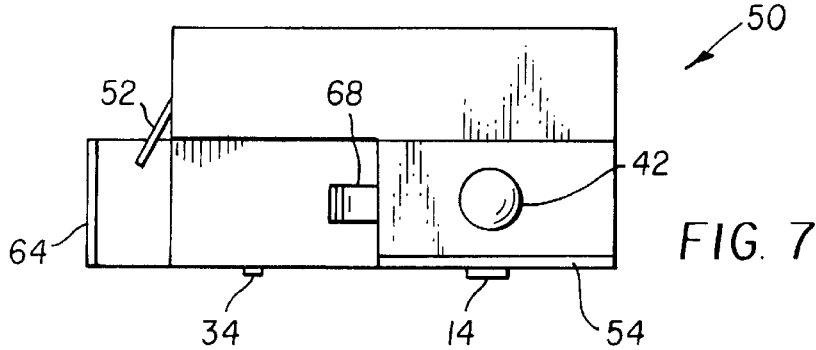

FIGS. 5, 6, 6A, and 7 illustrate an alternative version of a camera with reflector 182 which may be converted to continuous flashing mode with substantially 360 degree vision. This camera 50 illustrated in FIGS. 5, 6, 6A, and 7 maintains the generally cubical profile of the prior art camera 10 of FIG. 1, while still presenting substantially 360 degree viewing of the intermittent flash when it is activated. To utilize the continuous flash of this camera, hold down tab 52 as released allowing flash unit 54 to pivot on hinge 56. When the flash unit 54 pivots, there is a latching means comprised of protrusion 58 which fits into hole 62. The top piece 64 of flash unit 54 is raised using hinge 66 to allow the flash unit 54 to pivot. When the unit pivots, the wires 68 are of sufficient length that they may extend to the rotated position of the unit 54. As illustrated in FIGS. 6, 6A, and 7 where the flash unit 54 has been pivoted, the bulb 42 is visible for substantially 360 degrees. The camera may be set on end 17 for viewing of the bulb 42 in all directions. As stated with reference to camera 30, the bulb 42 may be provided with a protective covering in the rotated position that would serve to protect and could have a lens to direct the light horizontally when the camera was placed on its end. This would serve to extend the visible warning distance.

Figure 8A:
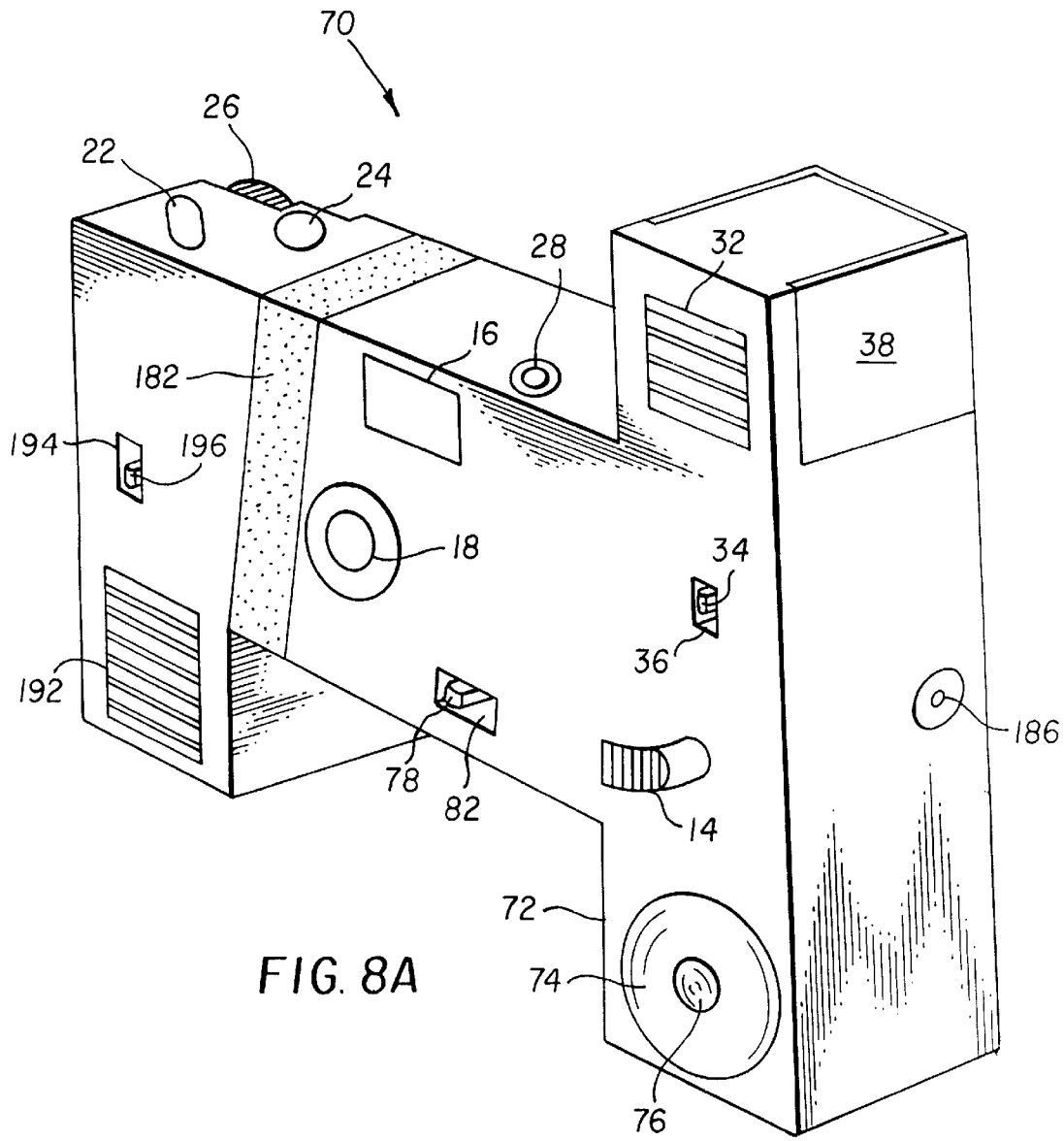
FIG. 8A illustrates a flash camera also having means for continuous illumination.
Figure 8B:
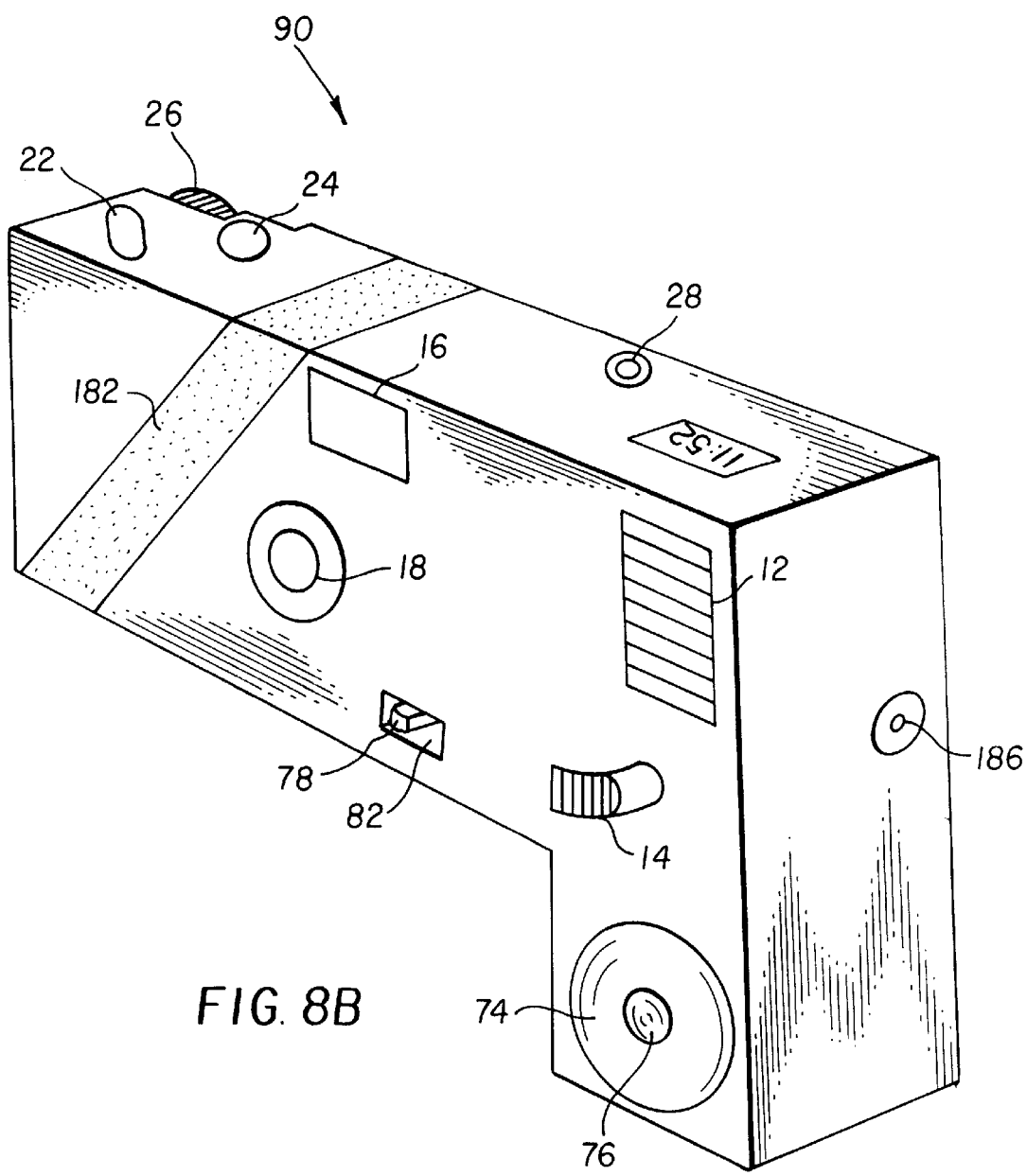
FIG. 8 illustrates a camera that is provided with the ability to provide continuous illumination, take flash pictures, and provide continuous intermittent flash in all directions for use as a warning device.

FIG. 8 illustrates a camera 70 with reflector 182 that has substantially the same structure as camera 30 but has additionally been provided with a flashlight module 72 and siren 192. The flashlight module 72 incorporates a reflector 74 and a flashlight bulb 76. When it is decided to use a camera as a flashlight, the switch 78 is moved to position 82 to provide continuous light. This camera, therefore, has four uses of the same battery power for a siren, for ordinary flash pictures, for emergency continuous, intermittent flashing as a strobe, and as a flashlight. The flashlight both can serve as emergency illumination such as light for a camera owner whose car has broken down, or as light to allow the user of the camera to frame a picture which will be taken with a flash. The single-use camera in FIG. 8 further incorporates a jack 186 that may be utilized for providing a separate continuous power source to the camera. The camera of FIG. 8 with its siren, strobe, flash picture-taking ability, and flashlight, therefore, serves as a very effective safety device. If someone carrying the camera becomes concerned about another person, they could take their picture, set off a strobe and a siren, as well as lighting up the potential attacker or thief with a continous light beam. The noise and sound generated would serve to discourage any aggression, as sufficient attention would be directed towards the single-use camera which was flashing and sounding a warning.

FIG. 8A illustrates a camera that has been provided with siren, a clock, and a continuous illumination device. The camera has a conventional flash unit 12. It is provided a means provided with continuous illumination by bulb 76 that is rounded by reflector 74. The continuous light source is activated by movement of switch 78 into area 82. The clock 92 allows the user to know the time events take place and is a convenience possible with the battery power source of the camera.

While the camera may not be aesthetically pleasing, it is within the skill of the art to design a generally rectangular camera incorporating both the continuous flashing, siren, and flashlight features of the cameras in a more pleasing package that would fall readily to hand. Most generally, the requirements for easy handling and transportability in, for example, a pocket are met when the one-time-use, single-use, or film-with-lens camera as described herein has a total volume of less than about 450 cubic centimeters (cc's), preferably the total volume is less than about 380 cc's, more preferably the total volume is less than about 300 cc's, and most preferably the total volume of the camera is less than about 220 cc's. The width to height to length of such a camera will generally be in an about 1:2:4 ratio, with a range in each dimension of about 25% so as to provide for comfortable handling. Additionally, the camera will preferably have the majority of corners and edges finished with a radius-of-curvature of between about 0.2 and 2 centimeters. Camera 30 illustrates a pivoting flash based on a generally rectangular camera. Further, it is possible that the whole corner of a generally rectangular camera could be removed to expose a bulb which would then become visible over a wide range.

While several variations of cameras of the invention are shown, it should be understood that the reflective and siren features may be combined with each other or any combination of the features shown, such as continuous light, intermittent flash, and exterior power.

The electronic circuitry required for the cameras, such as the instant invention, is illustrated in FIGS. 9–15 which will be described below. As this is intended to general circuitry, the numbers for the switches and bulb are not consistent with the camera descriptions, although as above stated, the numbers within the cameras' descriptions are consistent.

Figure 9:
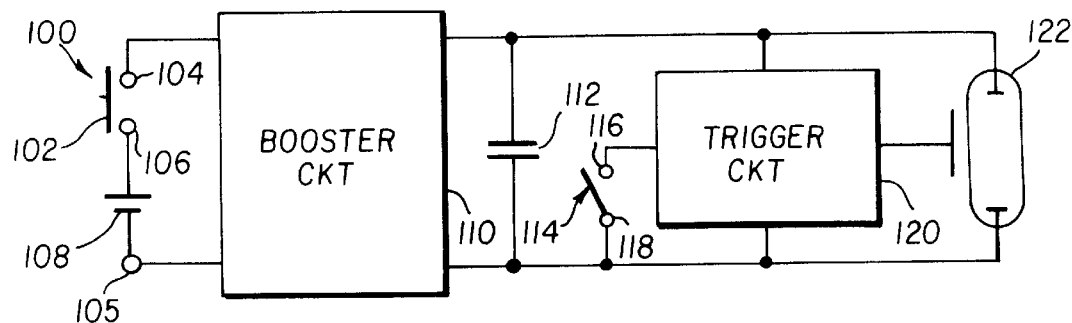
FIG. 9 shows the circuitry of a prior art flash unit as employed in a compact single-use camera.

FIG. 9 shows the circuitry of a prior art flash unit as employed in a compact single-use camera as disclosed in U.S. Pat. Nos. 5,235,364 and 5,315,332. The flash circuit includes the battery 108 as a power source, the main capacitor 112, the syncro-flash switch 114, the charge switch 100, a voltage booster circuit 110, a trigger circuit 120, a discharge tube 122, and contact points 104, 105, 106, 116 and 118. In operation, activation of the charge switch 100 enables conductive charge switch plate 102 to connect contact points 104 and 106, thereby providing power from battery 108 to the voltage booster circuit 110 which in turn charges the main capacitor 112. Contact points 105 and 118 form a common with one side of booster circuit 110. Activation of syncro-flash switch 114 enables an electrical connection between contact points 116 and 118 which, in turn, causes the trigger circuit 120 to provide a voltage spike to the discharge tube 122 causing the tube to become conductive and the charge stored on main capacitor 112 to be discharged through tube 122, thereby causing a light flash. In this circuit configuration, it is understood that the voltage supplied by the voltage booster circuit 110 and stored on capacitor 112 is insufficient to cause discharge tube 122 to fire in the absence of a signal, in the form of a high voltage spike from trigger circuit 120. The charge switch 100 may be activated by a push button as described in the art, while the syncro-flash switch 114 is activated either directly by the camera shutter release mechanism, by full opening of the camera aperture or shutter, or by a combination of both. Alternatively, the charge switch may be activated by the film advance mechanism of the camera as described in U.S. Pat. No. 5,337,099.

Figure 10:
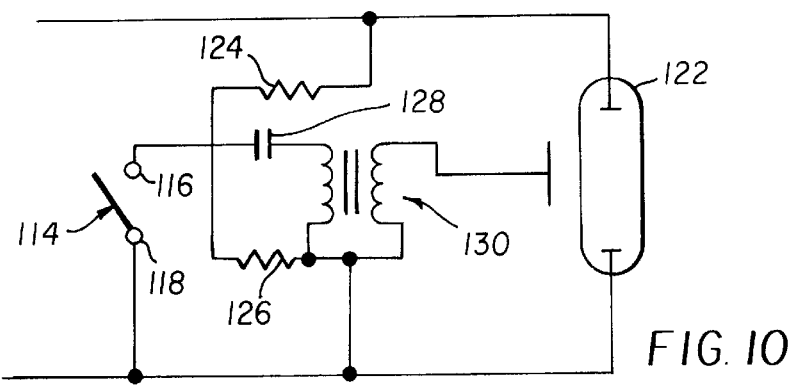
FIG. 10 illustrates circuitry of the trigger circuit of FIG. 9.

The trigger circuit 120 of FIG. 9 is shown in greater detail in FIG. 10. Here, a portion of FIG. 10 is reproduced to better illustrate the relationship of the trigger circuit to the entire flash unit circuit. All parts not otherwise identified have the same meaning as already described. Resistors 124 and 126 of the trigger circuit form a voltage divider which enables appropriate charging of capacitor 128 from the output of booster circuit 110. Activation of the syncro-flash switch 114 shorts resistor 126 which, in turn, causes the rapid discharge of the charge stored on capacitor 128 through the primary coil of transformer 130. This, in turn, induces a voltage spike from the secondary coil of transformer 130 which is applied to the dischage tube 122 causing it to fire.

Figure 11:
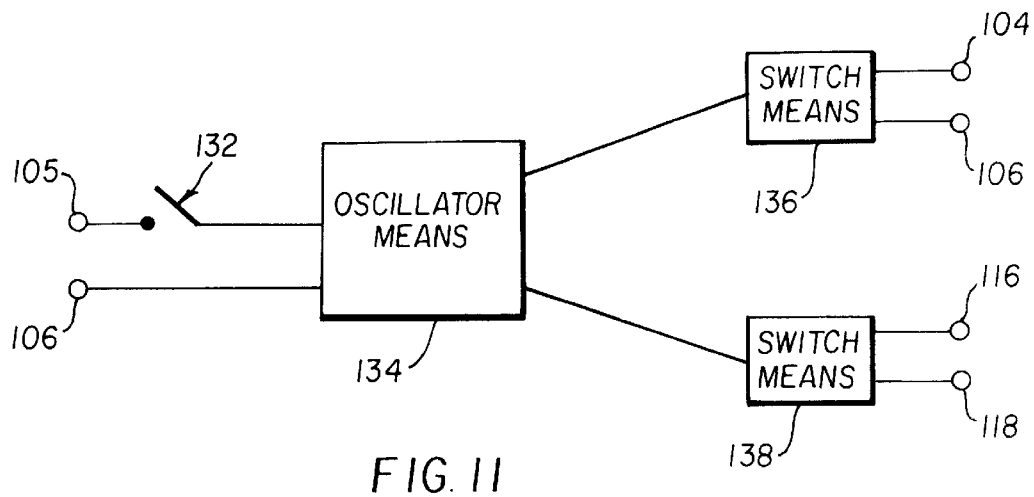
FIG. 11 shows a circuit enabling repeated discharge of a flash unit.

FIG. 11 shows a generalized flash repeater modification of the circuit of FIG. 9, enabling repeated discharge of the flash unit. The repeating flash unit includes an activation means 132, an oscillator means 134, and two switch means 136 and 138. These means are interconnected to the flash unit of FIG. 9 through contact points 104, 105, 106, 116, and 118. All parts not otherwise shown have the same meaning as already described. Repeated discharge is achieved by closure of switch 132 which activates oscillator means 134 which, in turn, causes switch means 136 and 138 to activate in an alternative fashion. When switch means 136 is activated, contact points 104 and 106 are connected, thereby providing power to the booster circuit 110 and charging main capacitor 112. When switch means 138 is activated, contact points 116 and 118 are connected, thereby enabling trigger circuit 120 to cause flash discharge tube 122 to fire. The frequency of oscillator means 134 can be chosen to enable repeated firing of discharge tube 122 at a low frequency, thereby providing an emergency flash unit, or at a higher frequency thereby providing a nearly continuous light source.

Figure 12:
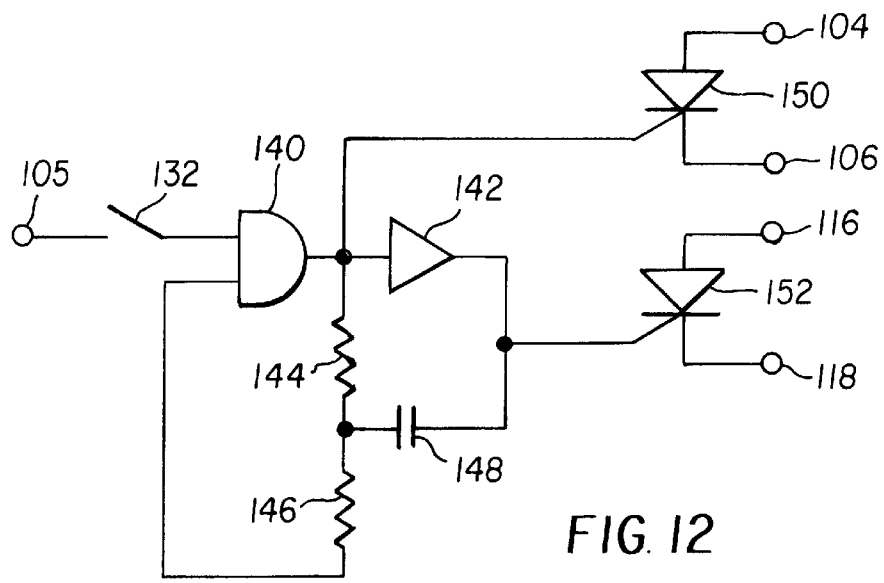
FIG. 12 shows details of an embodiment of the repeating discharge flash unit of FIG. 11.

FIG. 12 shows details of an embodiment of the repeating discharge flash unit of FIG. 11. Here NAND GATE 140 and NOT GATE 142 are additionally powered and initially biased by connection to point 106. Activation of switch means 132 provides a high signal to the first input of NAND GATE 140, while the second input of the NAND GATE 140 is biased with a low signal. The output of the NAND GATE is high, and silicone controlled rectifier 150 becomes conductive, thus shorting contact points 104 and 106 thereby powering the booster circuit 110 and causing the main capacitor 112 to become charged. NOT GATE 142 ensures that silicone controlled rectifier 152 is always reverse biased relative to silicone controlled rectifier 150 and thus that contact points 104 and 106, and contact points 116 and 118 will be alternatively closed. Resistors 144 and 146, together with capacitor 148, form a feedback RC timing circuit. As capacitor 148 becomes fully charged, the second input of the NAND GATE 140 is driven to a high signal, thereby causing the output of the NAND GATE 140 to be low and the output of the NOT GATE 142 to become high. In this condition, silicone controlled rectifier 150 becomes non-conductive, while silicone controlled rectifier 152 becomes conductive and enables trigger circuit 120 to cause discharge tube 122 to fire. After a suitable time delay, the RC timing circuit again reverses the second input to NAND GATE 140, the initial condition is restored, and the cycle repeats. Here, the flash frequency is controlled by choice of the capacitance and resistance of the capacitor and resistor of the RC circuit.

In one embodiment suitable for emergency signaling use with a low frequency flash, activation switch 132 can be linked to the discharge tube revelation means previously described, thereby simultaneously exposing discharge tube 122 for wide angle illumination and activating the flash repeater circuit. In another embodiment, the camera body may carry a selection means which suitably alters the repeat frequency of oscillator means 134, thereby enabling either continuous illumination or emergency flash to be obtained. For example, in the feedback RC timing circuit described above, resistor 144 can be replaced by a variable resistor or shunted to a lower resistance to increase the flash repeat frequency.

Figure 13:
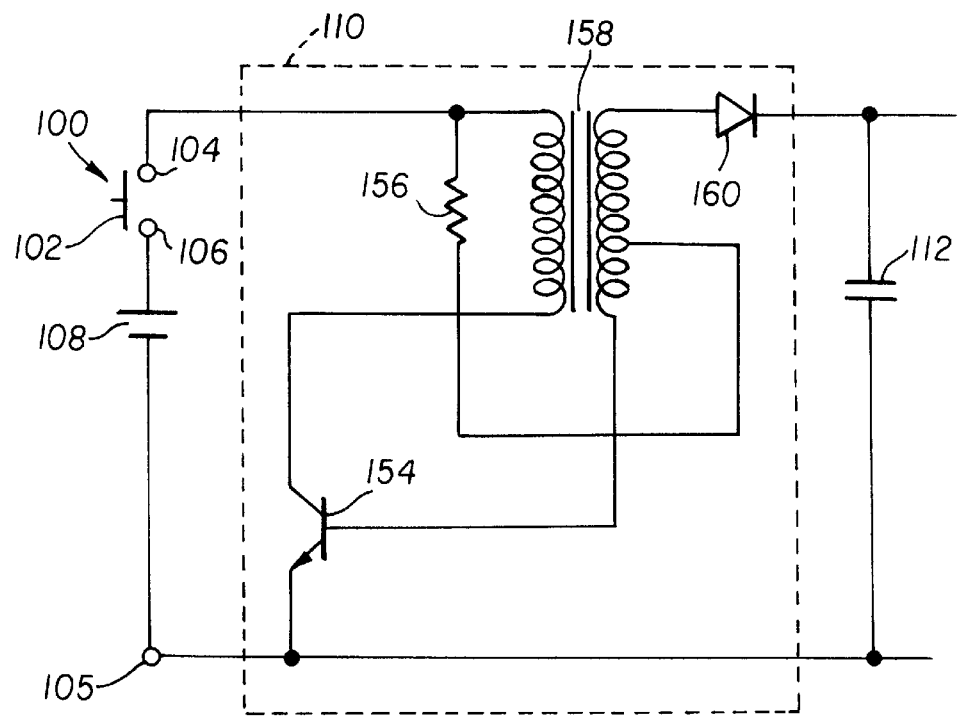
FIG. 13 illustrates circuitry of the voltage booster circuit of FIG. 9.

The voltage booster circuit 110 of FIG. 9 is shown in greater detail in FIG. 13. Here, a portion of FIG. 9 is reproduced to better illustrate the relationship of the trigger circuit to the entire flash unit circuit. All parts not otherwise identified have the same meaning as already described. The known voltage booster circuit 110 is constituted of a transistor 154, a resistor 156, a transformer 158, and a diode 160. When contact points 104 and 106 are connected, a low voltage is supplied to the booster from battery 108. The transistor 154 repeats on and off states alternately to supply pulsing current to the primary coil of the transformer 158 which causes high-voltage alternating current to be generated in the secondary coil. The alternating current generated in the secondary coil is converted to direct current by the diode 160. The transistor is driven to the alternate on and off states by the resistive-inductive feedback circuit formed by the resistor 156 and the coils of transformer 158. The voltage boost supplied by the voltage booster is related to the number of turns in the primary and secondary coils of the transformer 158.

Figures 14, 15:
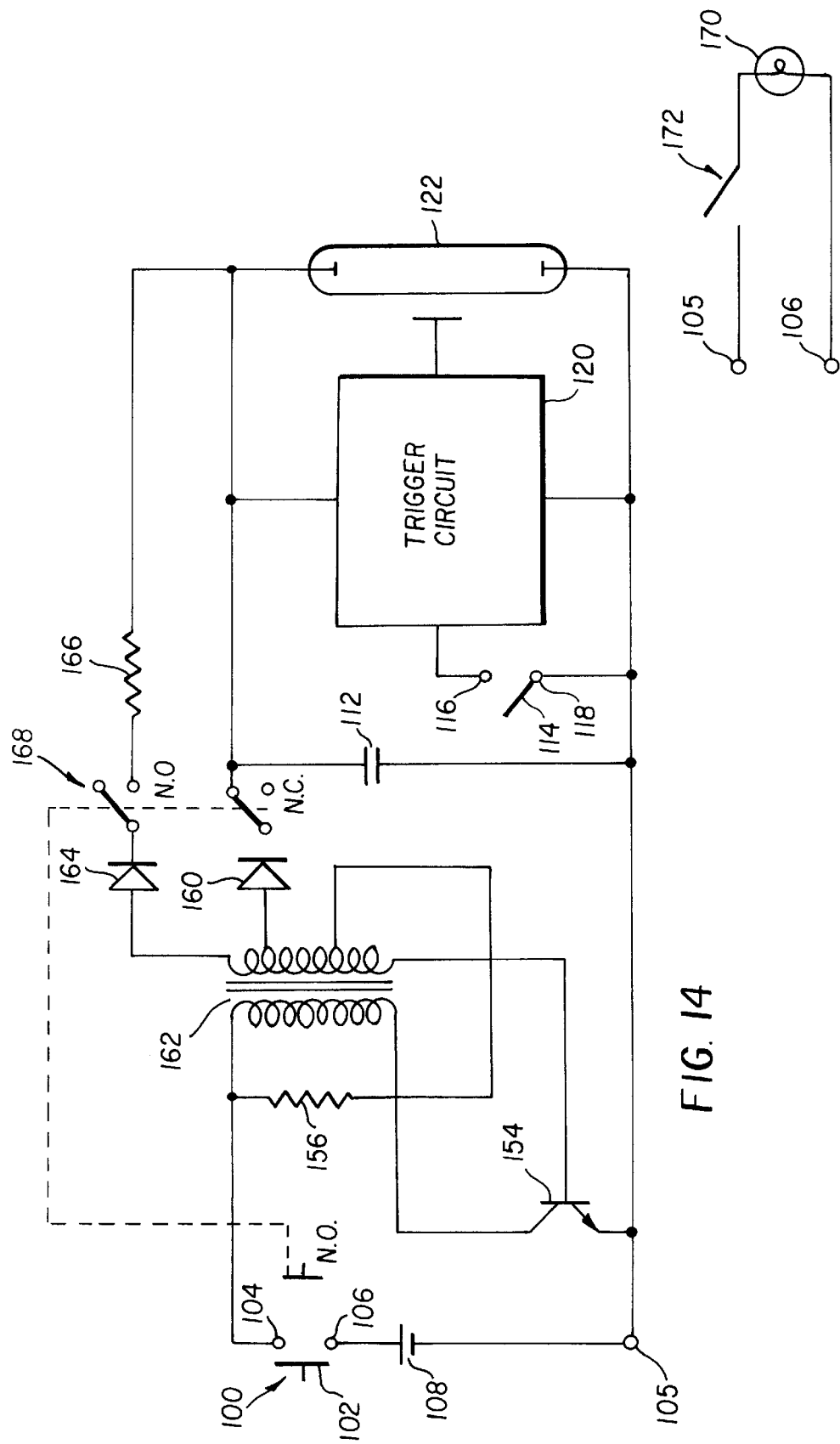
FIG. 14 shows a second modification of the circuit of FIG. 9 enabling repeated discharge of the flash unit.
FIG. 15 shows a modification of the circuit of FIG. 9 enabling continuous illumination.

FIG. 14 shows a second modification of the circuit of FIG. 9 enabling repeated discharge of the flash unit. The components include a transformer diode 164, a resistor 166, and a ganged switch means 168 with one normally closed connection and two normally open connections. Transformer 162 differs from transformer 158 in that the secondary coil includes additional windings and an additional winding tap-point, thereby enabling transformer 162 to deliver either the same voltage output from the tap-point as is normally required to drive the flash unit or a higher voltage. When ganged switch means 168 is in the normal position (shown in FIG. 14), power is supplied through diode 160 in the normal manner and the flash unit circuit operates in the manner already described. When ganged switch 168 is activated, three circuit changes are simultaneously enabled. First, contact points 104 and 106 are connected, thereby providing battery power to the voltage booster circuit 110. Second, diode 160 is disconnected from the remainder of the circuit. Third, power is supplied to the main capacitor 112 through diode 164 and resistor 166. The number of windings in the secondary coil of transformer 162 are chosen to provide a voltage higher than the discharge voltage of flash tube 122. Thus, as capacitor 112 becomes fully charged through resistor 166, flash discharge tube 122 discharges spontaneously and the charging cycle begins again. The rate of flashing is related to the RC time constant for charging capacitor 112 through resistor 166 and can be made longer or shorter by choice of the exact voltage delivered from transformer 162 and by the resistance supplied by resistor 166.

In one embodiment suitable for emergency signaling use with a low frequency flash, activation switch 168 can be linked to the discharge tube revelation means previously described, thereby simultaneously exposing discharge tube 122 for wide angle illumination and activating the flash repeater circuit. In another embodiment, the camera body may carry a selection means which suitably alters the repeat frequency of flashing, thereby enabling either continuous illumination or emergency flash to be obtained. For example, in the feedback RC timing circuit described above, resistor 166 can be replaced by a variable resistor or shunted to a lower resistance to increase the flash repeat frequency, thereby providing apparently continuous illumination.

FIG. 15 shows a modification of the circuit of FIG. 9 enabling continuous illumination. This modification includes a prefocused low voltage incandescent bulb 170 (76 in FIG. 8) and an activating switch means 172 (78 in FIG. 8). Only the connection points 105 and 106 of FIG. 9 are shown. Here activation switch 172 can be linked to the bulb revelation means previously described, thereby simultaneously exposing bulb 170 for wide-angle illumination and activating the bulb circuit. In another embodiment, the bulb may be provided in a revealed manner and the activation switch employed to power the bulb circuit.

The exact light output of the continuous or emergency illumination means is not critical to the normal operation of the film with lens or single-use camera according to the invention since the illumination thus provided is not generally intended to enhance picture taking per se, but rather to provide collateral value to the owner of such a camera. However, better control of the light output can be provided by addition of a flash commutation capacitor or other control circuitry as known in the art. Some examples are the circuit control means described at U.S. Pat. Nos. 5,250,977; 4,608,522; 4,717,861; 4,626,093; 4,591,762; 4,847,538; and 4,275,335. Additional useful circuitry is described at U.S. Pat. Nos. 5,250,978; 5,159,381; 5,189,344; 4,613,847; and 4,623,824.

While the control circuits, electro-optical means and mechanical means described above have been generally directed towards single-use cameras with incorporated power and flash units, they can be directly applied to single-use cameras designed for use with accessory reusable electronic flash units. Such units are, for example, described in U.S. Pat. Nos. 4,801,957; 4,903,058; 4,973,998; and 5,003,330.

While the above descriptions of cameras and circuitry for multiple types of lighting are considered representative of this invention, it is, of course, possible within this invention to provide other variations of exposable flashing units and continuous exposure flashlights. For instance, the flashlight element could be provided with a squeeze activation such that when a portion of the camera was squeezed, the continous light would come on. This might be particularly desirable when the flashlight was intended to illuminate a picture prior to flash and would require only brief illumination when the camera was in position to take a picture. In other variations, the flashing unit could be on an extendable device that is raised from the camera for picture taking. The devices are known in reusable cameras to prevent red eye by raising the flash away from the lens. These and other variations are intended to be included by this invention which is only intended to be limited by the scope of the claims attached hereto.

Any camera speed imaging means employable in known single-use, one-time-use, or film-with-lens cameras may be employed as the image capture means of the current invention. These single-use cameras of the invention can provide specific features as known in the art such as shutter means, film advance means, waterproof housings, single or multiple lenses, lens selection means, variable aperture, focus or focal length lenses, means for monitoring lighting conditions, means for altering shutter times or lens characteristics based on lighting conditions or user provided instructions, and means for recording use conditions directly on the film.

These features include but are not limited to: providing simplified mechanisms for manually or automatically advancing film and resetting shutters as described at Skarman, U.S. Pat. No. 4,226,517; providing apparatus for automatic exposure control as described at atterson et al, U.S. Pat. No. 4,345,835; moisture-proofing as described at Fujimura et al, U.S. Pat. No. 4,766,451; providing internal and external film casings as described at Ohmura et al, U.S. Pat. No. 4,751,536; providing means for recording use conditions on the film as described at Taniguchi et al, U.S. Pat. No. 4,780,735; providing lens fitted cameras as described at Arai, U.S. Pat. No. 4,804,987; providing film supports with superior anti-curl properties as described at Sasaki et al, U.S. Pat. No. 4,827,298; providing a viewfinder as described at Ohmura et al, U.S. Pat. No. 4,812,863; providing a lens of defined focal length and lens speed as described at Ushiro et al, U.S. Pat. No. 4,812,866; providing multiple film containers as described at Nakayama et al, U.S. Pat. No. 4,831,398 and at Ohmura et al, U.S. Pat. No. 4,833,495; providing films with improved anti-friction characteristics as described at Shiba, U.S. Pat. No. 4,866,469; providing winding mechanisms, rotating spools or resilient sleeves as described at Mochida, U.S. Pat. No. 4,884,087; providing a film patrone (container) removable in an axial direction as described by Takei et al at U.S. Pat. Nos. 4,890,130 and 5,063,400; providing an electronic flash means as described at Ohmura et al, U.S. Pat. No. 4,896,178; providing an externally operable member for effecting exposure as described at Mochida et al, U.S. Pat. No. 4,954,857; providing film support with modified sprocket holes and means for advancing said film as described at Murakami, U.S. Pat. No. 5,049,908; providing internal mirrors as described at Hara, U.S. Pat. No. 5,084,719; and providing silver halide emulsions suitable for use on tightly would spools as described at Yagi et al, European Patent Application 0,466,417 A. The disclosures of these publications are incorporated by reference.

A taking lens mounted on the single-use cameras of the invention are generally single aspherical plastic lenses having a focal length between about 10 and 100 mm, and apertures between f/2 and f/32. The focal length is preferably between about 15 and 60 mm and most preferably between about 20 and 40 mm. Apertures of between f/4 and f/16 are preferred with an aperture of about f/8 to f/12 being more preferred. This combination of focal length and aperture provides for good field of view with simultaneous compact camera design. The lens MTF can be as low as 0.6 or less at a spatial frequency of 20 lines per millimeter (lpm), although values as high as 0.7 or most preferably 0.8 are contemplated. Multiple lens arrangements comprising two, three or more component lens elements consistent with the functions described above are specifically contemplated.

The shutter means employed with the camera allows an exposure time of less than about $1/100$ second so as to minimize sharpness losses due to shake inherent with hand held cameras. Shutter times of $1/125$ sec to about $1/500$ sec are preferred because this provides a good balance of reduced camera motion and mechanically reproducible exposure times.

The camera provides means for exposing more than one scene per unit of film, with arrangements enabling the exposure of 6, 10, 12, 24, 27, 36 or even more distinct scenes being especially preferred.

The camera enables exposure of any desired image areas on the film. Typical are areas of less than about 10 $cm^2$. Even smaller exposure areas can be employed with values of less than 9, 8, or 7 $cm^2$ being preferred. Exposure areas of about 5 $cm^2$ or less are considered as suitable for negative film intended for use to produce snapshot size prints. Exposure areas between about 5 $cm^2$ and 0.5 $cm^2$ are particularly contemplated.

The photographic sensitivity or speed of color negative photographic elements is inversely related to the exposure required to enable the attainment of a specified density above fog after processing. Photographic speed for color negative films with a gamma of about 0.65 has been specifically defined by the American National Standards Institute (ANSI) as ANSI Standard Number PH 2.27-1979 (ASA speed) and relates to the exposure levels required to enable a density of 0.15 above fog in the green light sensitive and least light sensitive color records of a multicolor negative film. This exposure level defines the speed point of the photographic element. This definition conforms to the International Standards Organization (ISO) film speed rating.

Larger values of ISO or ANSI film speed indicate a more sensitive photographic element. Speeds between 100 and about 3200 are suitable for the film in the single-use camera of the invention. It is contemplated that the element exhibit an ISO speed such as ISO 125, ISO 160, or more preferred an ISO 200, and most preferred is ISO 400, to ISO 1600.

Film latitude relates to the range of exposures that can be successfully recorded by a photographic element. For the purposes of this invention, useful latitude can be quantified by determining the exposure range which provides a straight line relationship between exposure and density after a white light exposure and processing with less than a 30% drop from straight line in either an underexposed (toe) or overexposed (shoulder) regime in a green or red color record. In order to provide a range a recordable exposures, film latitude in excess of 1.5 log E is typical, film latitude greater than 2.1 log E is suitable and film latitude greater than about 2.8 log E and up to about 4 log E is preferred for the single-use camera of the invention because this provides a wide variety of useful exposure conditions. In one embodiment, the image capture means employs light sensitive silver halide crystals coated on a support. In this embodiment, it is preferred to employ a high sensitivity, long latitude, high sharpness film exhibiting high environmental insensitivity good tone scale and color reproduction, if a color film, for such uses because such high quality films compensate for the known environmental trauma typically suffered by such cameras and the known lens and illumination deficiencies typically inherent in such cameras. Typical films suitable for such use are described in U.S. Pat. Nos. 5,422,231 (Nozawa) and 5,466,560 (Sowinski et al), the disclosures of which are incorporated herein by reference.

Additionally, the cameras of this invention may be fitted with means of accessing power from outside sources, such as 186, so as to enable continuous use of the flashing or signaling function beyond the range typically provided by the installed battery. In one embodiment, the camera body is fitted with a jack having a built-in switch to disconnect the battery when the external power source is applied. One embodiment of such an external power source is an automobile power circuit in which case a separate connector suitable for tapping power through an automobile cigarette lighter and a power cord with a built-in voltage step-down circuit may be provided. In another embodiment, the external power source is a boat power circuit. In yet another embodiment, the external power source is a portable battery. Finally, the external power source can be a high voltage AC circuit typically 120/240 volts in the United States in which case the specific separate connector will include a step-down transformer and rectifier circuit as known in the art. In an alternative embodiment, the camera body may be fitted with an activation means and a jack having a built-in switch means which together enable the flashing or continuous illumination function already described when the outside power source fails, thereby providing emergency illumination automatically.

The invention has been described in detail with particular reference to preferred embodiments thereof, but it will be understood that variations and modifications can be effected within the spirit and scope of the invention.

We claim:

1. A camera comprising a camera body having means for reflecting light wherein said means for reflecting light is selected from the group consisting of a reflective microsphere coating, a retro-retlective surface coating, a retro-reflective microprism coating, a holographic metallized mirror coating, and a retro-reflective sheet coating, and said means for reflecting light is attached to more than one side of said body.

2. The camera of claim 1 wherein said reflective means is visible for substantially 360 degrees.

3. A camera according to claim 1 wherein
said body has a total volume of up to 450 cubic centimeters and a width to height to length ratio of about 1:2:4;
a lens has a focal length of between 10 and 100 mm and an aperture of between f/2 and f/32;
a light sensitive photographic element has a photographic sensitivity of between ISO 100 and ISO 3200 and a film latitude greater than 2.8 log E; and
said shutter enables exposure of said element for less than 1/100 second.

4. The camera of claim 1 further comprising a continuous light source.

5. The camera of claim 4 wherein said continuous light source comprises a light focused in the same area as the lens of said camera.

6. The camera of claim 1 wherein said camera is a single-use camera.

7. The camera of claim 6 further comprising means for providing auxiliary power to said camera.

8. The camera of claim 1 wherein said camera further comprises means for repetitive flashing, said means not initiated by shutter operation.

9. The camera of claim 8 wherein said means for repetitive flashing is also a flash unit for photographic use and said repetitive flashing means is visible for substantially 360°.

10. The camera of claim 9 further comprising a removable cover member wherein said cover is removed to provide a wider viewing angle for the repetitive flashing means.

11. The camera of claim 9 wherein the flash unit of said camera is moved to a second position to provide continuous flashing.

12. A camera comprising
a body,
a siren mounted to said body,
a shutter mounted to said body,
a shutter release mounted to said body for releasing said shutter, and
a switch mounted to said body for activating said siren to emit sound,
wherein said siren activating switch is independent of said shutter release,
wherein said camera further comprises means for reflecting light and wherein said means for reflecting light comprises retro-reflective material attached on more than one side of said camera.

13. The camera of claim 12 further comprising a continuous light source.

14. The camera of claim 12 wherein said continuous light source comprises a light focused in the same area as the lens of said camera.

15. The camera of claim 12 further comprising means for providing auxiliary power to said camera.

16. The camera of claim 12 wherein said camera is a single-use camera.

17. The camera of claim 12 further comprising a clock.

18. A camera according to claim 12 wherein
- said body has a total volume of up to 450 cubic centimeters and a width to height to length ratio of about 1:2:4;
- a lens has a focal length of between 10 and 100 mm and an aperture of between f/2 and f/32;
- a light sensitive photographic element has a photographic sensitivity of between ISO 100 and ISO 3200 and a film latitude greater than 2.8 log E; and
- said shutter enables exposure of said element for less than 1/100 second.

19. The camera of claim 12 wherein said siren is adapted to emit a sound of at least than 80 decibels.

20. The camera of claim 12 further comprising means for continuous repetitive flashing and wherein said repetitive flashing means allows visibility at substantially 360°.

21. The camera of claim 20 wherein said camera further comprises a means for providing continuous light.

* * * * *